United States Patent
Conner, II et al.

(10) Patent No.: US 8,108,910 B2
(45) Date of Patent: Jan. 31, 2012

(54) METHODS AND APPARATUS FOR ADAPTIVELY DETERMINING TRUST IN CLIENT-SERVER ENVIRONMENTS

(75) Inventors: William G. Conner, II, Peoria, IL (US); Arun Kwangil Iyengar, Yorktown Heights, NY (US); Thomas A. Mikalsen, Cold Spring, NY (US); Isabelle Marie Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

(21) Appl. No.: 11/873,144

(22) Filed: Oct. 16, 2007

(65) Prior Publication Data

US 2009/0100504 A1 Apr. 16, 2009

(51) Int. Cl.
*G06F 7/04* (2006.01)
*G06F 17/30* (2006.01)
*G06F 15/16* (2006.01)

(52) U.S. Cl. ....... 726/3; 726/4; 726/8; 726/29; 713/168; 709/203; 709/205; 709/217; 709/225; 709/226; 709/228; 709/229; 707/783; 705/80

(58) Field of Classification Search .......... 726/3
See application file for complete search history.

(56) References Cited

U.S. PATENT DOCUMENTS

| 6,341,353 | B1 | 1/2002 | Herman et al. |
| 6,349,338 | B1 * | 2/2002 | Seamons et al. ............. 709/229 |
| 7,177,929 | B2 * | 2/2007 | Burbeck et al. ............. 709/224 |
| 7,213,047 | B2 | 5/2007 | Yeager et al. |
| 7,353,534 | B2 * | 4/2008 | Stephens ........................... 726/3 |
| 7,367,888 | B1 * | 5/2008 | Chen et al. ...................... 463/42 |
| 7,406,436 | B1 * | 7/2008 | Reisman ........................... 705/10 |
| 7,512,649 | B2 * | 3/2009 | Faybishenko et al. ........ 709/201 |
| 2002/0138402 | A1 * | 9/2002 | Zacharia et al. ................. 705/37 |
| 2002/0198845 | A1 * | 12/2002 | Lao et al. ......................... 705/51 |
| 2003/0030680 | A1 * | 2/2003 | Cofta et al. .................... 345/864 |
| 2003/0046097 | A1 | 3/2003 | LaSalle et al. |

(Continued)

FOREIGN PATENT DOCUMENTS

GB      GB2415580      12/2005

OTHER PUBLICATIONS

Zhang, Q., et al, 'A Classification Scheme for Trust Functions in Reputation-Based Trust Management', 2004, Dept of CS, N. Carolina St. Univ., entire document, http://www4.ncsu.edu/~tyu/pubs/sw04-reputation.pdf.*

(Continued)

*Primary Examiner* — Edan Orgad
*Assistant Examiner* — Ronald Baum
(74) *Attorney, Agent, or Firm* — Preston J. Young; Ryan, Mason & Lewis, LLP

(57) ABSTRACT

Techniques are disclosed for adaptively determining trust in client-server environments. By way of example, a method for assigning a trust level to a client in a client-server environment including at least one client communicating with a plurality of servers includes the following steps. Information associated with a server s1 and a server s2 different from s1 is obtained regarding a request r1 sent by a client and received by s1 and a request r2 sent by the client and received by s2. The obtained information is utilized to assign at least one trust level to the client.

19 Claims, 6 Drawing Sheets

U.S. PATENT DOCUMENTS

| | | | |
|---|---|---|---|
| 2003/0140230 A1 | 7/2003 | de Jong et al. | |
| 2004/0064335 A1 | 4/2004 | Yang | |
| 2004/0181665 A1 | 9/2004 | Houser | |
| 2006/0253583 A1 | 11/2006 | Dixon et al. | |
| 2007/0136178 A1* | 6/2007 | Wiseman et al. | 705/37 |
| 2007/0168298 A1* | 7/2007 | George et al. | 705/75 |
| 2008/0022384 A1* | 1/2008 | Yee et al. | 726/11 |
| 2009/0049514 A1* | 2/2009 | Yan et al. | 726/1 |
| 2009/0299819 A1* | 12/2009 | Davis et al. | 705/10 |

OTHER PUBLICATIONS

L. Xiong et al., "PeerTrust: Supporting Reputation-Based Trust for Peer-to-Peer Electronic Communities," IEEE Transactions on Knowledge and Data Engineering, Jul. 2004, pp. 843-857, vol. 16, No. 7.

L. Zeng et al., "Quality Driven Web Services Composition," In International Conference on Web Services, May 2003, 11 pages.

S. Kalepu et al., "Reputation = f(User Ranking, Compliance, Verity)," Proceedings of the IEEE International Conference on Web Services, 2004, 8 pages.

S. Park et al., "Resilient Trust Management for Web Service Integration," In International Conference on Web Services, 2005, pp. 1-8.

E. Damiani et al., "A Reputation-Based Approach for Choosing Reliable Resources in Peer-to-Peer Networks," In 9th ACM Conference on Computer and Communications Security, Nov. 2002, 10 pages.

S.D. Kamvar et al., "The Eigen Trust Algorithm for Reputation Management in P2P Networks," In International World Wide Web Conference, May 2002, 12 pages.

* cited by examiner

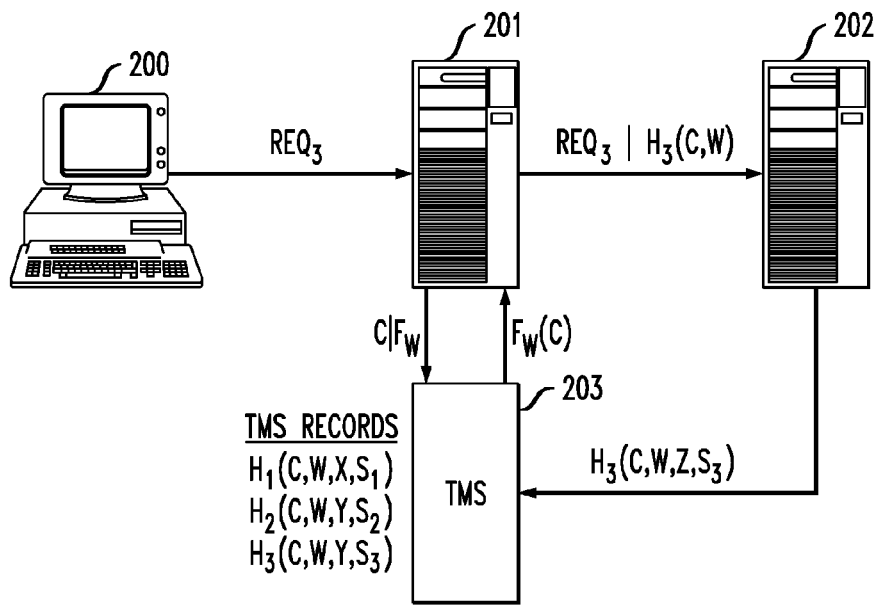
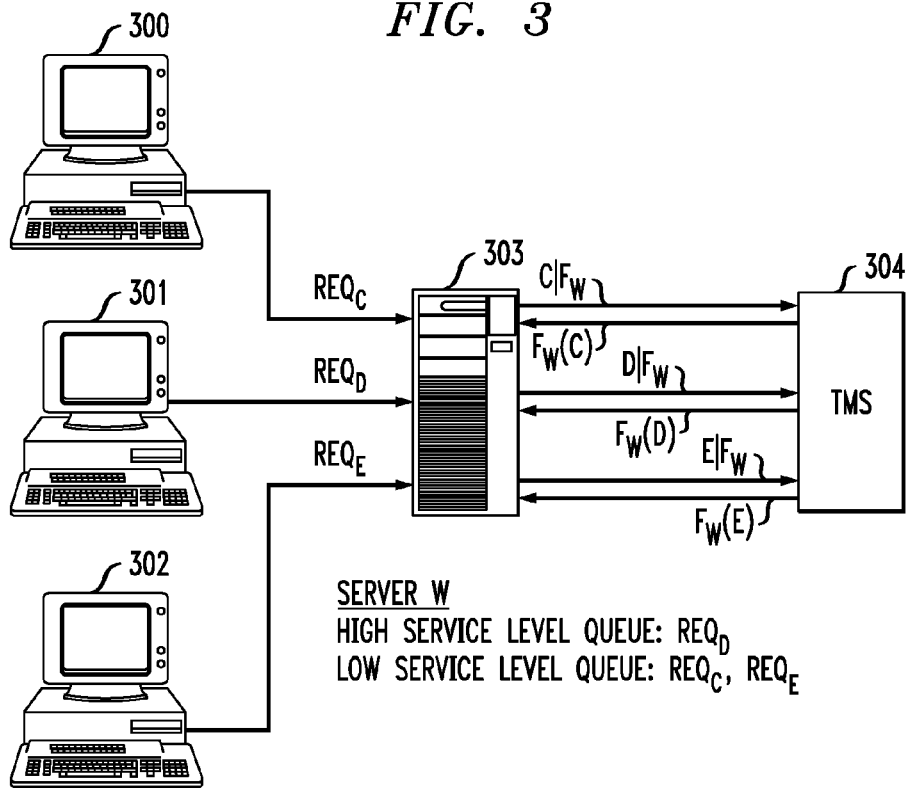

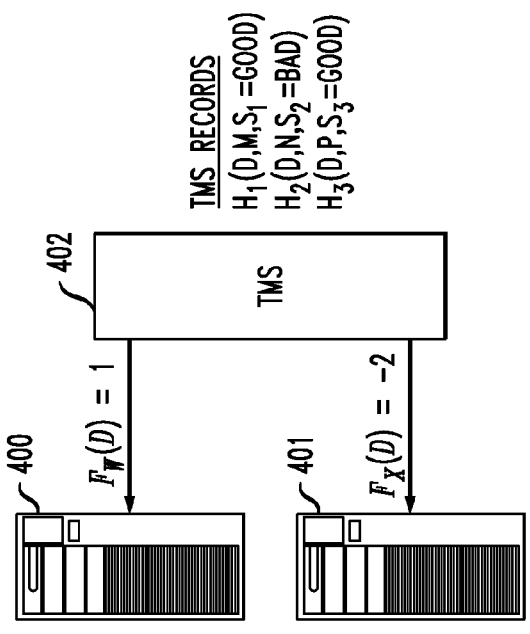
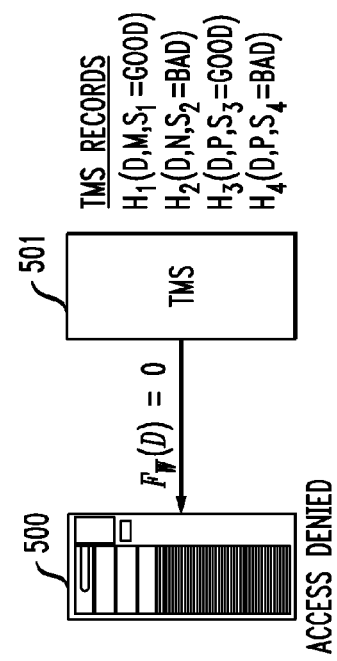
FIG. 4
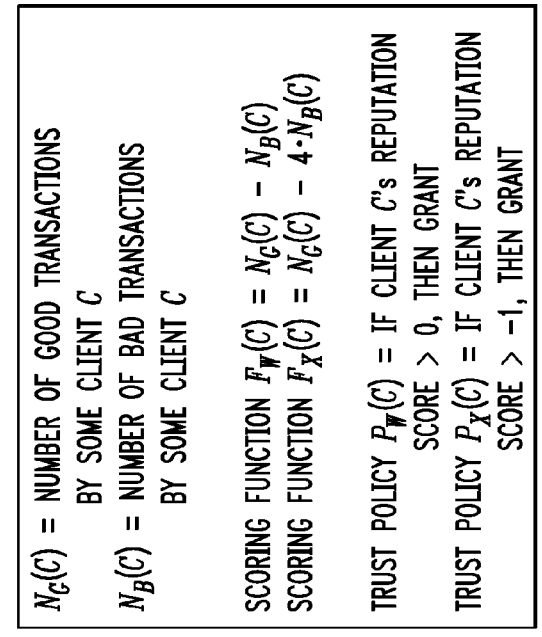
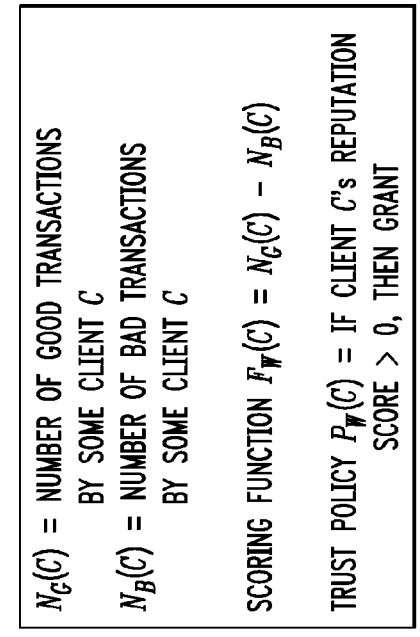
FIG. 5A

METHODS AND APPARATUS FOR ADAPTIVELY DETERMINING TRUST IN CLIENT-SERVER ENVIRONMENTS

FIELD OF THE INVENTION

The present application relates to client-server environments and, more particularly, to techniques for adaptively determining trust in such client-server environments.

BACKGROUND OF THE INVENTION

Reputation-based trust management has been previously considered for a wide range of applications including the following: online auction sites, Web service selection, and peer-to-peer networks.

Many online auction sites, such as eBay.com, rate buyers and sellers by collecting and aggregating feedback. However, such online auction schemes are often very vulnerable to strategic misbehavior because the aggregate ratings provide very little contextual information.

Reputation management has also been applied to the problem of Web service selection. In this line of work, the reputation management systems are designed to protect clients by facilitating their selection of the most reputable Web services. However, existing work on Web service selection does not look at reputation from a perspective other than the client's perspective.

The prevalence of bogus content being disseminated in peer-to-peer file sharing applications has also led to much research on reputation management systems for peer-to-peer networks. However, unlike a peer-to-peer network running a single application, a group of servers could potentially host many different applications with each server having its own criteria for trust.

Accordingly, improved techniques are needed for adaptively determining trust in client-server environments.

SUMMARY OF THE INVENTION

Principles of the present invention provide techniques for adaptively determining trust in client-server environments.

By way of example, in a first aspect of the invention, a method for assigning a trust level to a client in a client-server environment including at least one client communicating with a plurality of servers includes the following steps. Information associated with a server s1 and a server s2 different from s1 is obtained regarding a request r1 sent by a client and received by s1 and a request r2 sent by the client and received by s2. The obtained information is utilized to assign at least one trust level to the client.

The trust level may be used to assign a level of access and/or a level of service to the client by the servers. The trust level may be computed by considering trust information from previous requests to the servers and/or information summarizing trust information from previous requests to the servers. At least two servers may use different methods for computing trust levels from the same trust information. Further, at least two different trust levels may be computed for the client using the same method at different times.

A trust level may be assigned by a server j to a client c using a formula:

$$\text{TRUST}(c, j) = \sum_{i \in SC} TF(i,j) \cdot [w_{pos}(j) \cdot Pos(c,i) + w_{neu}(j) \cdot Neu(c,i) + w_{neg}(j) \cdot Neg(c,i)]$$

wherein
SC=set of server classes,
Pos(c,i)=number of positive feedback units assigned to client c by server class i,
Neu(c,i)=number of neutral feedback units assigned to client c by server class i,
Neg(c,i)=number of negative feedback units assigned to client c by server class i,
$w_{pos}(j)$=weight assigned to positive feedback by server j,
$w_{neu}(j)$=weight assigned to neutral feedback by server j,
$w_{neg}(j)$=weight assigned to negative feedback by server j, and
TF(i,j)=trust factor assigned to server class i by server j.

Further, a trust level may be assigned by a server W to a client c using a formula:

$$\text{TRUST}(c,W) = \text{Pos}(c,P) - \text{Neg}(c,P)$$

wherein
Pos(c,i)=number of positive feedback units assigned to client C by server class i, and
Neg(c,i)=number of negative feedback units assigned to client c by server class i.

Still further, a trust level may be assigned by a server X to a client c using a formula:

$$\text{TRUST}(c, X) = \sum_{i \in SC} [Pos(c,i) + 0.2 \cdot Neu(c,i) - 4.0 \cdot Neg(c,i)]$$

wherein
Pos(c,i)=number of positive feedback units assigned to client c by server class i,
Neu(c,i) number of neutral feedback units assigned to client c by server class i, and
Neg(c,i)=number of negative feedback units assigned to client C by server class i.

In a second aspect of the invention, an article of manufacture for assigning a trust level to a client in a client-server environment includes at least one client communicating with a plurality of servers, the article including a computer readable storage medium including one or more programs which when executed by a computer perform the steps of obtaining information associated with a server s1 and a server s2 different from s1 regarding a request r1 sent by a client and received by s1 and a request r2 sent by the client and received by s2, and utilizing the obtained information to assign at least one trust level to the client In a third aspect of the invention, apparatus for assigning a trust level to a client in a client-server environment including at least one client communicating with a plurality of servers includes one or more memories and one or more processors coupled to the one or more memories and operative to: (i) obtain information associated with a server s1 and a server s2 different from s1 regarding a request r1 sent by a client and received by s1 and a request r2 sent by the client and received by s2; and (ii) utilize the obtained information to assign at least one trust level to the client.

In a fourth aspect of the invention, a method for assigning a trust level to a client in a client-server environment including at least one client communicating with a plurality of servers includes the following steps. The client sends requests to the plurality of servers in which at least one request r1 is received by a server s1 and at least one request r2 is received by a server s2 different from s1. Information is shared between s1 and s2 regarding r1 and r2. The shared information is used to assign at least one trust level to the client.

Advantageously, as will be illustratively described herein, principles of the invention provide methods and systems by which a group of servers can assess the trust levels of incoming requests from external clients. Each server might host one or more different applications. Oftentimes, applications running on servers are hastily developed without much concern for security, which makes them particularly vulnerable to attacks. Principles of the invention provide an adaptive, reputation-based trust management system. This trust management system allows a group of servers to share previous experiences with external clients and to assess the trust level of incoming requests from external clients based on the client's reputation computed from this shared feedback. The trust management system allows each server to perform trust level assessments with its own custom reputation scoring function that suits its individual needs.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 illustrates how servers make trust level assessments for the purpose of access control using a trust management system, according to an embodiment of the invention.

FIG. 3 illustrates how servers make trust level assessments for the purpose of differentiating service levels using the trust management system, according to an embodiment of the invention.

FIG. 4 illustrates how two servers can make different trust level assessments of a client even when both servers consider exactly the same data for that client, according to an embodiment of the invention.

FIGS. 5A and 5B illustrate how one server can make different trust level assessments of the same client at different points in time, according to an embodiment of the invention.

DETAILED DESCRIPTION OF PREFERRED EMBODIMENTS

The present invention will be explained below in the context of an illustrative supply chain management application. However, it is to be understood that the present invention is not limited to any such application. Rather, the invention is more generally applicable to any applications in which it would be desirable to improve trust management functions in a client-server environment that executes such applications.

As used herein, the term "client," as used herein, generally refers to a computing device used by one or more individuals to communicate with one or more servers, while the term "server," as used herein, generally refers to a computing device that hosts one or more applications with which a client interacts. An "application" generally refers to one or more software programs that perform one or more functions. Furthermore, the term "trust" generally refers to confidence, for example, in a commerce application, confidence in the certainty of future payment for property or goods received.

A trust management system (TMS), according to principles of the invention, enables servers to perform customized reputation-based trust level assessments for external clients. By "external," we mean clients that are remote to the servers. In order to collect information about the past behavior of clients, servers report information about their experiences with external clients to the TMS. In order to make trust level assessments, servers also send their individual scoring functions to the TMS for evaluation. Since servers might have different trust criteria, we allow them to use their own personalized scoring functions rather than restricting every server to the same global reputation-based trust metric. This allows more flexibility than existing approaches.

Collecting Feedback

In a TMS according to an embodiment of the invention, the past behavior of a client may be represented by a collection of invocation history records. Invocation history records may include the following fields: client C that initiated the transaction, one or more servers $SRV_i$ invoked during the transaction (in order), and a judgment on the final status S of the transaction (e.g., benign, malicious). We have chosen to include the invoked servers in these records in order to provide additional contextual information that can be used later by the scoring functions. An invocation history containing three invoked servers appears in the following example.

Invocation History Record
(C=ClientId, $SRV_1$=Retailer, $SRV_2$=Warehouse, $SRV_3$=Manufacturer, S=Benign)

Figure 1A:
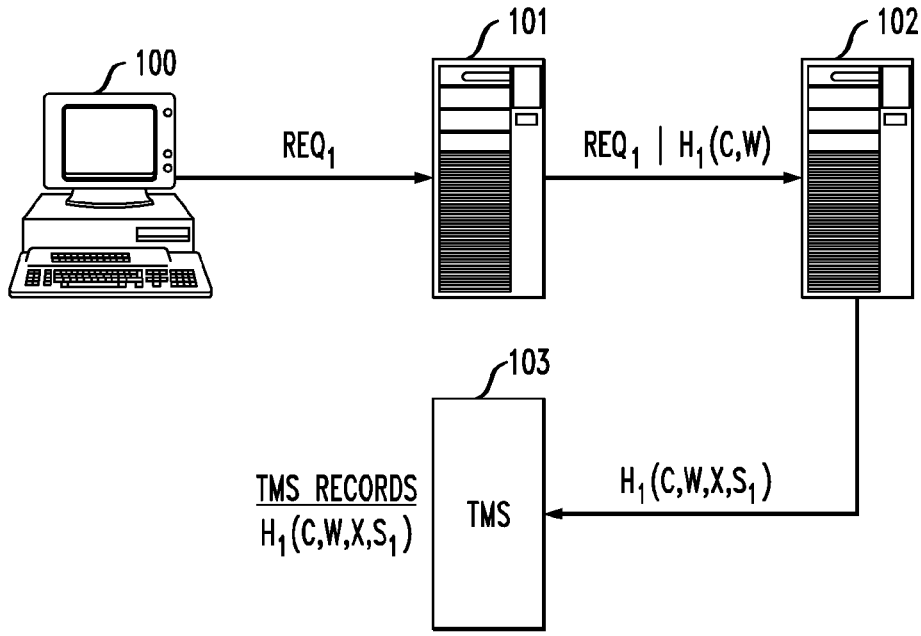
FIGS. 1A and 1B illustrate how servers provide feedback to a trust management system, according to an embodiment of the invention.
Figure 1B:
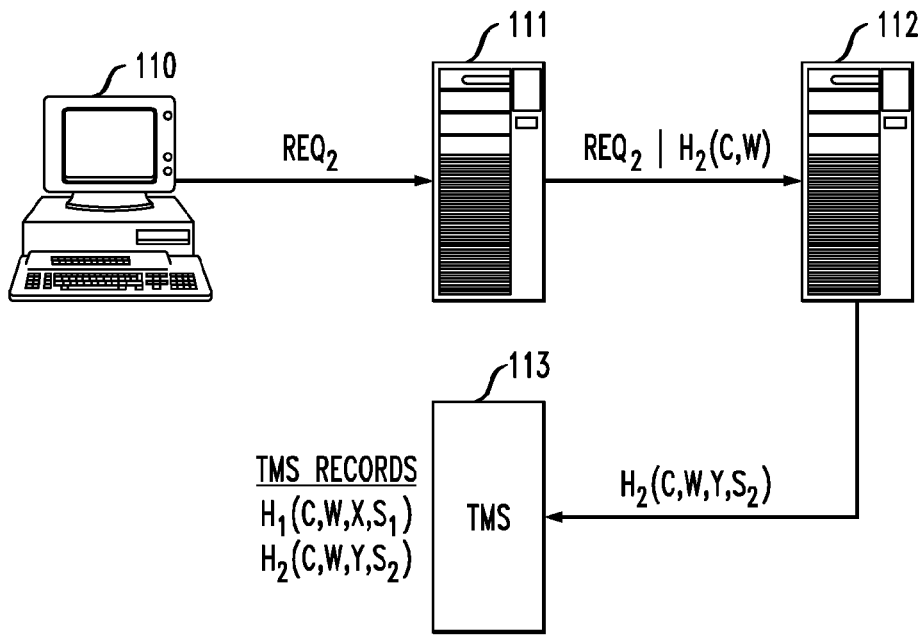

Invocation history records can be created and reported using the following steps, which are illustrated in FIGS. 1A and 1B.

1. Whenever a client C makes a request to server W, then W will create an initial invocation history record H=(C, W).
   a. If no other servers are invoked as a result of C's request, then W will judge the status S of the request from C and update H=(C, W, S'). W will then report H to the TMS.
   b. If additional servers are invoked as a result of C's request, then W will invoke those servers and pass along H=(C, W) to them.

2. Upon receiving a request from another server W, server X will update the invocation history record H=(C, . . . , W, X).
   a. If no other servers are invoked as a result of W's request, then X will judge the status S of the request from C via W and update H=(C, . . . , W, X, S'). X will then report H to the TMS.
   b. If additional servers are invoked as a result of W's request, then X will invoke those servers and pass along H=(C, . . . W, X) to them.

In FIGS. 1A and 1B, we see that some client C (shown in FIG. 1A as 100 and FIG. 1B as 110) has invoked server W (shown in FIG. 1A as 101 and FIG. 1B as 111) twice. One invocation has resulted in server X (shown in FIG. 1A as 102) being called and the other invocation has resulted in server Y (shown in FIG. 1B as 112) being called. Also shown are the resulting TMS records that are stored at the TMS server (shown in FIG. 1A as 103 and FIG. 1B as 113) after each request.

Assessing Trust Levels of Incoming Requests

Since each server might have its own individual notion of trust for external clients, servers can supply custom reputation scoring functions to be evaluated by the TMS over the invocation history records. Based on the reputation score computed, servers can determine whether or not the reputation of the client making the request exceeds its minimal trust threshold to grant the request.

Rather than using reputation scores solely for the purpose of access control, the trust level assessment performed by servers can also determine the assignment of requests to a particular service class (e.g., high priority versus low priority). For example, a client c1 with a high reputation score could be given preferential treatment and a high quality of service. During periods of heavy load, requests from c1 could be served before requests received around the same time by another client c2 with a lower reputation score. This could give requests from c1 a faster average response time than similar requests received from c2.

The following steps are performed by servers to evaluate the trust level of external clients.

1. When server X receives a request without an invocation history (i.e., request directly from some client C) or with an invocation history (i.e., request from some client C via some server W), X can send a customized reputation scoring function $F_X$ to the TMS to evaluate X's specific level of trust in the request from C.
   a. In order to support flexibility, $F_X$ can be any arbitrary scoring function defined over a list of invocation records.
   b. Preferably, the scoring function uses some contextual information, but the server is left with the choice of using such information or not. For example, a server might consider only the client identifier. Alternatively, a server might also consider the servers previously invoked along the path from the client to itself.

2. In cases where we would like to enforce a system-wide policy using reputation-based trust level assessments, we can redirect requests from external clients to go through the TMS, which would act as any other server that applies its own reputation scoring function and trust level assessment.

Assuming that the two requests from FIGS. 1A and 1B have already been made, FIG. 2 shows the steps involved in the evaluation of a scoring function. In FIG. 2, depending on the status of the first two invocations initiated by client C (shown in FIG. 2 as 200) and server W's (shown in FIG. 2 as 201) custom scoring function $F_W$, W may or may not call server Z (shown in FIG. 2 as 202) as a result of the incoming request from C. The TMS is shown in FIG. 2 as 203. In FIG. 3, server W (shown in FIG. 3 as 303) sends its custom scoring function $F_W$ to the TMS (shown in FIG. 3 as 304) in order to assign service levels to the requests from clients C, D, and E (shown in FIG. 3 as 300, 301 and 302, respectively).

One primary goal in designing a flexible trust management system is to allow servers to compute their own customized reputation scoring functions over the trust-related feedback data collected by the TMS. This would allow two different servers with different reputation scoring functions to make two different trust level assessments for a client with the same given behavior. FIG. 4 illustrates how two different scoring functions can be used to make different trust level assessments by two servers W (shown in FIG. 4 as 400) and X (shown in FIG. 4 as 401) over the same data for some client D. The TMS is shown in FIG. 4 as 402. In FIG. 4, although the policy $P_X$ for X has a lower threshold than policy $P_W$ for W, the scoring function $F_X$ penalizes evidence of bad transactions much more than $F_W$. Even though both scoring functions use the same input data for client D, customization leads servers W and X to different conclusions about whether or not they will grant the incoming request from D. W will grant the request while X will deny the request.

Figure 5B:
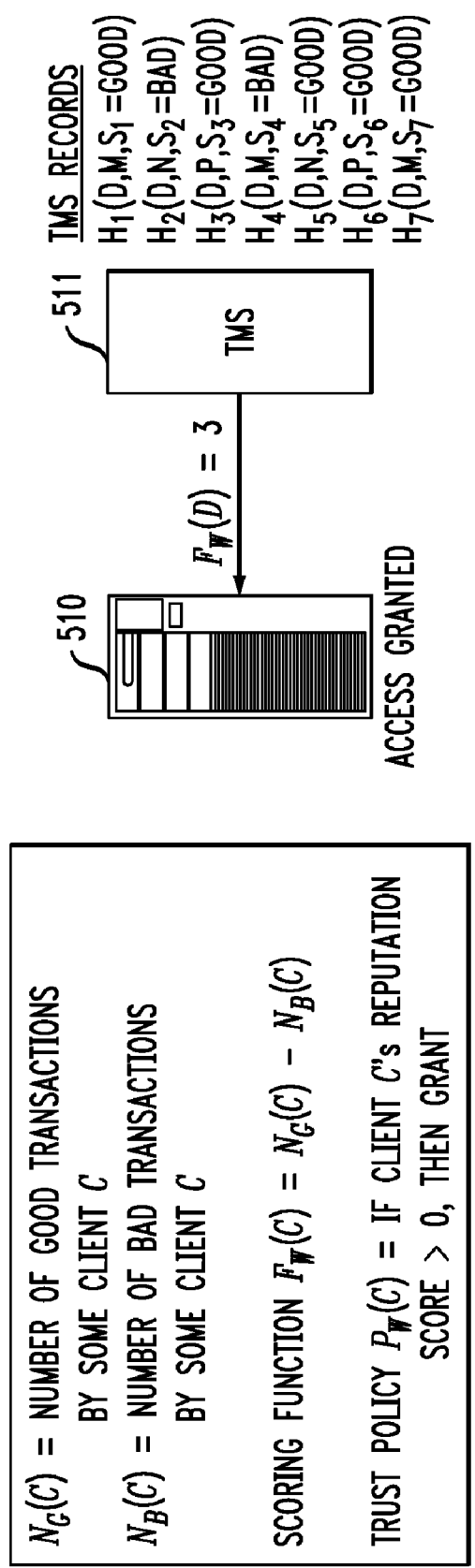

In addition to supporting customized reputation scoring functions from different servers, we also sought to design a trust management system that adapts to client behavior over time. FIGS. 5A and 5B illustrate how the same scoring function from the same server might lead to two different trust level assessments for a particular client at different times. FIG. 5A shows that access would be denied by the server (server is shown as 500 and TMS as 501 in FIG. 5A) after four requests from client D. FIG. 5B shows that access would be by the server (server is shown as 510 and TMS as 511 in FIG. 5B) granted after seven requests from client D.

Computing Reputation Scoring Functions Over Summaries

Since one goal for providing a trust management system is to allow servers to perform custom trust-level assessments of external clients based on the reputations of those clients, in one embodiment, we can use any arbitrary reputation scoring function that takes a collection of invocation history records as input. The scoring functions in FIG. 4 are two examples. In these examples, a server can compute its scoring function on-demand (real-time) from the records stored by the TMS.

Although supporting arbitrary scoring functions allows servers to have much greater flexibility in evaluating the trust level of external clients compared to existing approaches, it might also lead to a large amount of overhead if the scoring functions are evaluated over all of the TMS data records each time. This overhead is due to storage (i.e., storing all the invocation history records at the TMS) and processing (i.e., computing scoring functions over all the records).

In order to improve performance, we describe another embodiment that computes scoring functions over a summary of the invocation history records rather than all of the records. To significantly reduce the storage and processing overhead, the TMS could maintain summaries of the invocation history records rather than maintaining all of the exact data. If summaries are stored at the TMS, then servers will have to supply custom scoring functions over the summaries rather than the original invocation history records.

In this illustrative embodiment, the data summaries that we propose are to store tuples in a relation at the TMS with the following format.

Summary Record (ClientId, Class, Pos, Neu, Neg)

In the summary records, ClientId identifies the client and Class identifies a server class. We assume that each server will typically be assigned to exactly one server class and that the number of server classes is typically much smaller than the total number of servers. A server class could indicate a level of trust (e.g., high versus low), type (e.g., retailer versus warehouse server), or domain (e.g., company X server versus company Y server). We also limit the feedback to three types. Pos indicates the number of positive interactions with the specified client as reported by all servers belonging to a particular server class. Similarly, Neu and Neg indicate the number of neutral interactions and negative interactions, respectively.

Figures 6, 7:
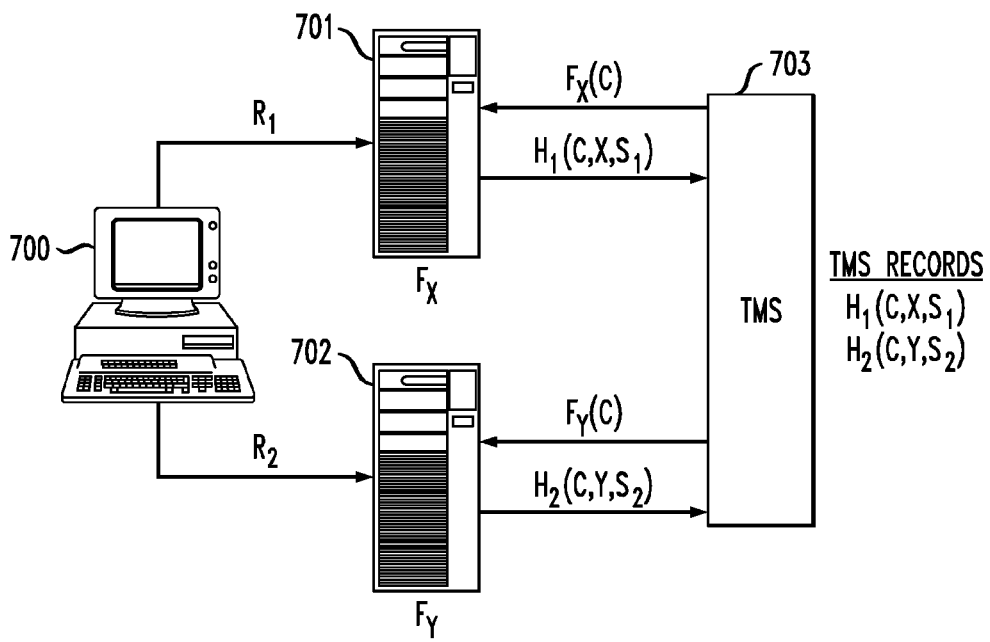
FIG. 6 provides an example of summarizing invocation history records, according to an embodiment of the invention.
FIG. 7 provides an overview of a trust management system with a single client interacting with two servers, according to an embodiment of the invention.

An example relation summarizing invocation history records appears in FIG. 6. The summary records (shown in FIG. 6 as 601) occupy less storage than the exact invocation history records (shown in FIG. 6 as 600). Using the information stored in this relation, a server can compute its customized scoring function. The suggested general formula for servers to compute trust levels for incoming requests from clients appears below. In general, servers can customize their scoring functions by adjusting the weights assigned to the three different types of feedback as well as their trust in the different service classes that report feedback. Although we include a suggested formula, it should be noted that servers still have the freedom to plug in any preferred scoring function defined over TMS summary data.

SC=set of server classes

Pos(c,i)=number of positive feedback units assigned to client c by server class i Neu(c,i)=number of neutral feedback units assigned to client c by server class i Neg(c,i)=number of negative feedback units assigned to client c by server class i $w_{pos}(j)$=weight assigned to positive feedback by server j $w_{neu}(j)$=weight assigned to neutral feedback by server j $w_{neg}(j)$=weight assigned to negative feedback by server j TF(i,j)=trust factor assigned to server class i by server j $$TRUST(c, j) = \sum_{i \in SC} TF(i, j) \cdot [w_{pos}(j) \cdot Pos(c, i) + w_{neu}(j) \cdot Neu(c, i) + w_{neg}(j) \cdot Neg(c, i)]$$

The general scoring function TRUST(c,j) above defines the level of trust that some server j would assign to some client c based on feedback from other servers. The following customized scoring function examples for two servers W and X are from a relation summarizing invocation history records as done in FIG. 6.

$$TRUST(c, W) = Pos(c, P) - Neg(c, P)$$

$$TRUST(c, X) = \sum_{i \in SC} [Pos(c, i) + 0.2 \cdot Neu(c, i) - 4.0 \cdot Neg(c, i)]$$

In the preceding example, the first scoring function TRUST (c,W) only considers feedback from servers within the class P and gives no weight to neutral experiences. On the other hand, the second scoring function TRUST(c,X) equally considers feedback from all server classes and gives a little weight to neutral experiences. TRUST(c,X) also penalizes clients receiving negative feedback more heavily than TRUST(c,W). Although we no longer have access to the level of detail contained in the original invocation history records, we are still able to provide some context for servers to use in their custom scoring functions. By using data summaries, we are able to significantly reduce storage and processing overhead.

FIG. 7 depicts a client-server environment including one client C (shown in FIG. 7 as 700) communicating with two servers X and Y (shown in FIG. 7 as 701 and 702, respectively). In this figure, each server will assign a trust level to C based on its respective scoring function, $F_X$ or $F_Y$. The scoring functions are evaluated at the trust management server TMS (shown in FIG. 7 as 703) assuming the following steps:

1. Invocation history record $H_1$ corresponding to request $R_1$ from C to X has been generated and stored at the TMS.

2. Invocation history record $H_2$ corresponding to request $R_2$ from C to Y has been generated and stored at the TMS.

3. Server X sends its scoring function $F_X$ to the TMS for evaluation. Notice that $F_X$ is computed over shared feedback from both X and Y about C.

4. Server Y sends its scoring function $F_Y$ to the TMS for evaluation. Notice that $F_Y$ is computed over shared feedback from both X and Y about C.

5. The reputation scores computed from their respective scoring functions are used by the servers to determine their level of trust in incoming requests from C.

Illustrative Implementation

To evaluate a trust management system formed in accordance with principles of the invention, we implemented the TMS as a Web service and composed it into our implementation of the Supply Chain Management (SCM) application scenario defined by the Sample Applications Working Group of the Web Services Interoperability Organization. Before describing our implementation, we first present an overview of the SCM application.

The SCM application scenario includes the following: one consumer, one retailer, three warehouses owned by the retailer, and three manufacturers that manufacture their own brand of the same three products (i.e., there are nine total products available). Each retailer, warehouse, and manufacturer corresponds to a Web service. There are no restrictions on which brands a warehouse can store (i.e., each warehouse can store all of the nine products). The consumer submits an order including line items to the retailer. Each line item identifies a product and the corresponding quantity to be ordered. Assuming that some pre-defined list specifying the sequence in which warehouses are contacted to ship individual line items from the order exists, the retailer goes through each line item and finds the first warehouse in the list with sufficient stock to ship the line item. This warehouse will then be chosen to ship the line item to the consumer. If no warehouse has sufficient stock to fulfill the order, then the line item will not be shipped at all. Each warehouse has some minimum threshold for each product and will order additional items from the manufacturer whenever inventory levels fall below this threshold for a particular product.

Figure 8:
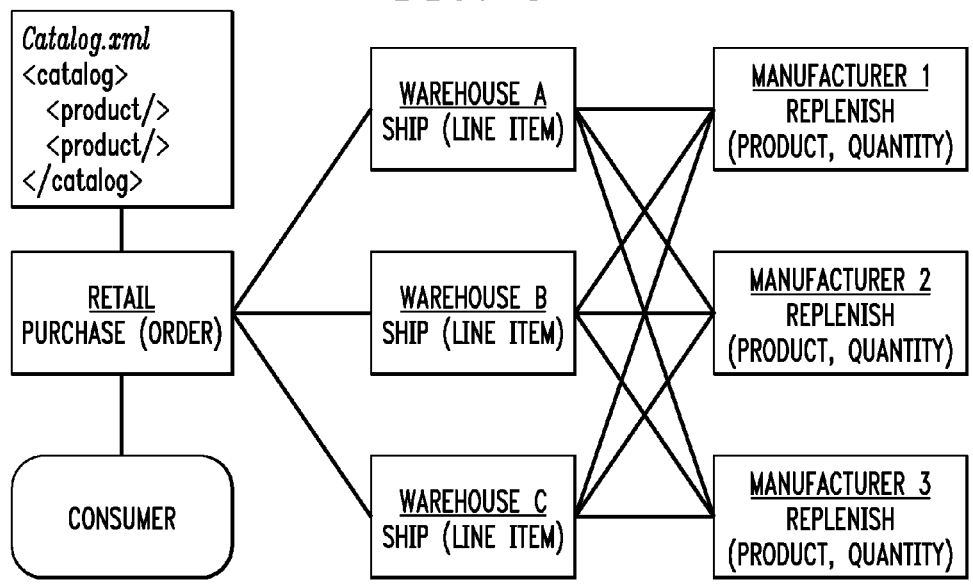
FIG. 8 provides an overview of a supply chain management application scenario used to evaluate a prototype of a trust management system in the context of Web services, according to an embodiment of the invention.

We used the Java runtime from the Apache Tuscany implementation of the Service Component Architecture to compose our SCM application. FIG. 8 shows a high-level view of our implementation of the SCM application specifications.

In one embodiment, the TMS is implemented in Java with an interface that provides two functions. The first function allows Web services to report invocation history records to the TMS by passing a Java object representation of an invocation history record as a parameter. The invocation history record information is then stored by the TMS in either complete or summarized form. The second function allows Web services to perform reputation-based trust level assessments by requesting that the TMS evaluate a client's reputation by passing a Java object representation of their custom scoring function as a parameter. Both the complete and summary modes of the TMS previously described are implemented. The TMS records for both modes are stored and retrieved from an Apache Derby relational database. The interface appears below.

report(InvocationHistory history);

score(ScoringFunction function);

To enhance our implementation of the SCM application by providing the TMS as a Web service, all of the Web services in the SCM application were modified to pass along invocation history records. For our illustrative prototype, we assumed that client requests for a particular line item would typically lead to one of the following outcomes: (1) all requested items shipped in exchange for payment; (2) all requested items appeared in catalog, but not all items could be successfully shipped; and (3) some items requested do not even appear in the catalog. In summary mode, these outcomes correspond to positive, neutral, and negative, respectively. The reason that shipped items are considered positive is because a payment has been made. Items unavailable for shipment that appeared in the catalog are considered neutral because no payments are made, but the customer is not at fault for selecting items that appeared in the catalog. Negative transactions are considered to be those transactions where the customer is trying to purchase items that do not exist in the catalog, because such activity might indicate a client attempting to waste resources.

Figure 9:
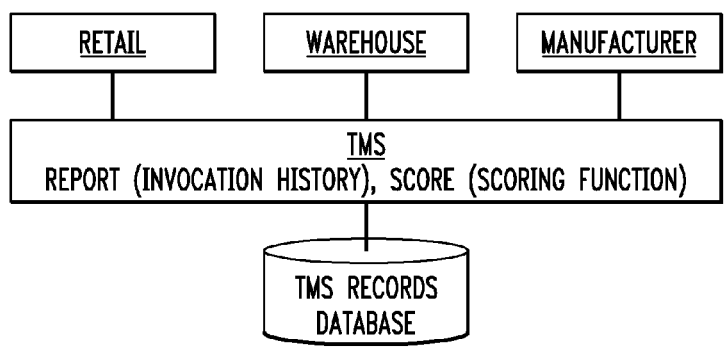
FIG. 9 provides an overview of a trust management system for a supply chain management application, according to an embodiment of the invention.

Although our illustrative prototype only considers one particular type of attack for our performance evaluation (i.e., clients intentionally ordering non-existent items to waste infrastructure resources), the TMS design is general enough to be easily extended for other types of attacks (e.g., XPath injection). FIG. 9 shows a high-level overview of the interaction between the Web services from the basic SCM application and the TMS.

Figure 10:
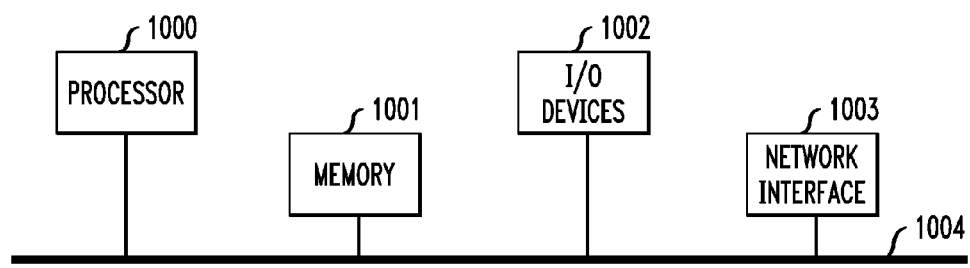
FIG. 10 illustrates a computer system wherein techniques for adaptively determining trust levels in a client-server environment may be implemented, according to an embodiment of the invention.

Referring lastly to FIG. 10, a computer system is illustrated wherein techniques for adaptively determining trust levels in a client-server environment may be implemented according to an embodiment of the invention. That is, FIG. 10 illustrates a computer system in accordance with which one or more components/steps of the trust level determination techniques (e.g., components and methodologies described above in the context of FIGS. 1A through 9) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 10 may represent the trust management system (TMS), one or more servers or one or more other processing devices capable of providing all or portions of the functions described herein. Alternatively, FIG. 10 may represent one or more client devices. That is, each computing element shown in the figures (e.g., client, server, TMS) may have such a configuration as shown in FIG. 10.

As shown, the computer system includes processor 1000, memory 1001, input/output (I/O) devices 1002, and network interface 1003, coupled via a computer bus 1004 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a client-server environment comprising at least one client communicating with a plurality of servers, a method for assigning a trust level to a client, the method comprising the steps of: obtaining trust information associated with a server s1 providing a first service and a server s2 providing a second service different from s1, with regard to a request r1 sent by a client and received by s1 and a request r2 sent by the client and received by s2; and aggregating the obtained trust information from s1 and s2 with regard to the client to assign at least one trust level to said client, wherein a trust level is assigned by a server X to a client c using a formula:

$$\text{TRUST}(c, X) = \sum_{i \in SC} [Pos(c, i) + 0.2 \cdot Neu(c, i) - 4.0 \cdot Neg(c, i)]$$

wherein SC=set of server classes, X=at least S1 and S2, Pos (c, i)=number of positive feedback units assigned to client c by server class i, Neu (c, i)=number of neutral feedback units assigned to client c by server class i, and Neg (c, i)=number of negative feedback units assigned to client c by server class i.

2. The method of claim 1, wherein the at least one trust level is used to assign a level of access to the client by at least one of the servers.

3. The method of claim 1, wherein the at least one trust level is used to assign a level of service to the client by at least one of the servers.

4. The method of claim 1, wherein the at least one trust level is computed by considering trust information from previous requests to the servers.

5. The method of claim 1, wherein at least one trust level is computed by considering information summarizing trust information from previous requests to said servers.

6. The method of claim 1, wherein at least two servers use different methods for computing trust levels from the same trust information.

7. The method of claim 1, wherein at least two different trust levels are computed for the client using a same method at different times.

8. The method of claim 1, wherein a trust level is assigned by a server j to a client c using a formula:

$$TRUST(c, j) = \sum_{i \in SC} TF(i, j) \cdot [w_{pos}(j) \cdot Pos(c, i) + w_{neu}(j) \cdot Neu(c, i) + w_{neg}(j) \cdot Neg(c, i)]$$

wherein
SC=set of server classes,
Pos(c,i)=number of positive feedback units assigned to client c by server class i,
Neu(c,i)=number of neutral feedback units assigned to client c by server class i,
Neg(c,i)=number of negative feedback units assigned to client c by server class
$w_{pos}(j)$=weight assigned to positive feedback by server j,
$w_{neu}(j)$=weight assigned to neutral feedback by server j,
$w_{neg}(j)$=weight assigned to negative feedback by server j, and
TF(i,j)=trust factor assigned to server class i by server j.

9. The method of claim 1, wherein a trust level is assigned by a server W to a client c using a formula:

$$TRUST(c,W) = Pos(c,P) - Neg(c,P)$$

wherein
Pos(c,i)=number of positive feedback units assigned to client c by server class i, and
Neg(c,i)=number of negative feedback units assigned to client c by server class i.

10. An article of manufacture for assigning a trust level to a client in a client-server environment comprising at least one client communicating with a plurality of servers, the article comprising a non-transitory computer readable tangible storage medium including one or more programs which when executed by a computer perform the steps of claim 1.

11. In a client-server environment comprising at least one client communicating with a plurality of servers, apparatus for assigning a trust level to a client, the apparatus comprising: one or more memories; and one or more processors coupled to the one or more memories and operative to: (i) obtain trust information associated with a server s1 providing a first service and a server s2 providing a second service, different from s1, with regard to a request r1 sent by a client and received by s1 and a request r2 sent by the client and received by s2; and (ii) aggregate the obtained trust information from s1 and s2 with regard to the client to assign at least one trust level to said client, wherein a trust level is assigned by a server X to a client c using a formula:

$$TRUST(c, X) = \sum_{i \in SC} [Pos(c, i) + 0.2 \cdot Neu(c, i) - 4.0 \cdot Neg(c, i)]$$

wherein SC=set of server classes, X=at least S1 and S2, Pos (c, i)=number of positive feedback units assigned to client c by server class i, Neu (c, i)=number of neutral feedback units assigned to client c by server class i, and Neg (c, i)=number of negative feedback units assigned to client c by server class i.

12. The apparatus of claim 11 wherein said at least one trust level is used to assign a level of access to said client by at least one of said servers.

13. The apparatus of claim 11, wherein at least one trust level is used to assign a level of service to said client by at least one of said servers.

14. The apparatus of claim 11, wherein at least one trust level is computed by considering trust information from previous requests to said servers.

15. The apparatus of claim 11, wherein at least one trust level is computed by considering information summarizing trust information from previous requests to said servers.

16. The apparatus of claim 11, wherein at least two servers use different methods for computing trust levels from the same trust information.

17. The apparatus of claim 11, wherein at least two different trust levels are computed for the client using a same method at different times.

18. In a client-server environment comprising at least one client communicating with a plurality of servers, a method for assigning a trust level to a client, comprising the steps of: the client sending requests to the plurality of servers in which at least one request r1 is received by a server s1 providing a first service and at least one request r2 is received by a server s2 providing a second service different from s1; sharing trust information between s1 and s2 regarding r1 and r2 of said client; and aggregating the shared trust information between s1 and s2 with regard to the client to assign at least one trust level to the client, wherein a trust level is assigned by a server X to a client c using a formula:

$$TRUST(c, X) = \sum_{i \in SC} [Pos(c, i) + 0.2 \cdot Neu(c, i) - 4.0 \cdot Neg(c, i)]$$

wherein SC=set of server classes, X=at least S1 and S2, Pos (c, i)=number of positive feedback units assigned to client c by server class i, Neu (c, i)=number of neutral feedback units assigned to client c by server class i, and Neg (c, i)=number of negative feedback units assigned to client c by server class i.

19. The method of claim 18, wherein the at least one trust level is used to assign at least one of a level of access and a level of service to the client by at least one of the servers.

* * * * *